MAGNETIC AMPLIFIER EXTENDER
Filed Oct. 27, 1958
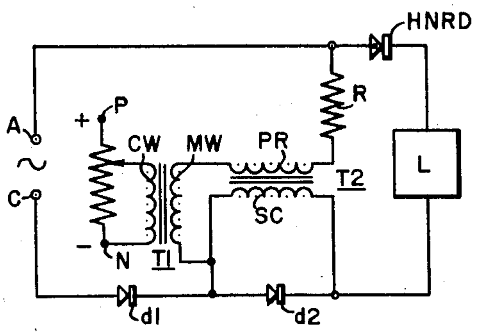
Fig. I.
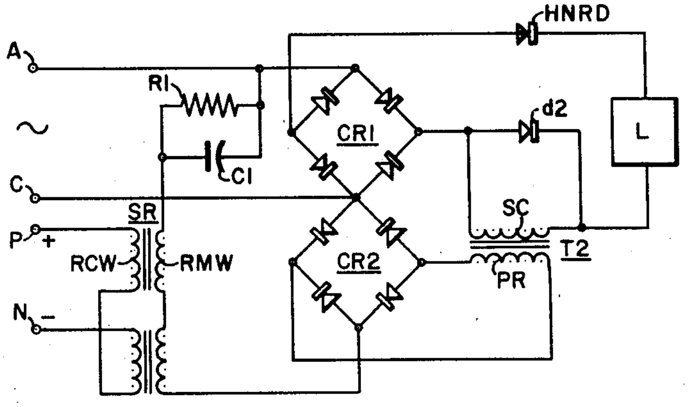
Fig. 2.
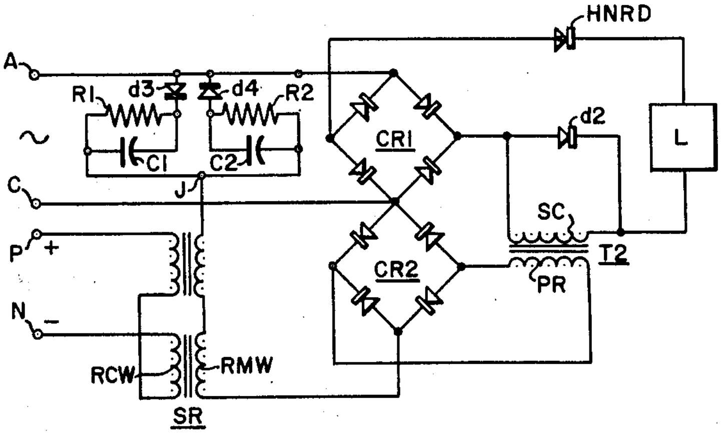
Fig. 3.
WITNESSES
Bernard R. Giegue
James F. Young
INVENTOR
Walter Ziffer
BY
Paul E. Friedemann
ATTORNEY

United States Patent Office 2,993,164

Patented July 18, 1961

2,993,164

MAGNETIC AMPLIFIER EXTENDER

Walter Ziffer, Clairton, Pa., assignor to Westinghouse Electric Corporation, East Pittsburgh, Pa., a corporation of Pennsylvania Filed Oct. 27, 1958, Ser. No. 769,650
11 Claims. (Cl. 323—66)

This invention relates to electrical control apparatus utilizing magnetic amplifier and saturable reactors in conjunction with a hyperconductive negative resistance diode.

This application is a continuation-in-part of an application filed by the same inventor, Serial No. 708,176, filed January 10, 1958 and entitled "Magnetic Amplifier Extender."

This diode is a semiconductor diode having such characteristics, that on exceeding certain specified reverse current and voltage, the diode becomes highly conductive and thereafter will carry a substantial reverse current at low voltage. This phenomena is not a Zener breakdown, nor is it an avalanche breakdown. This unique breakdown characteristic can be repeated indefinitely and is thus designated as having hyperconductive breakdown, and the diode is designated a hyperconductive negative resistance diode.

The amount of power that can be controlled by a magnetic amplifier or a saturable reactor such as used is closely related to the physical size and weight of the magnetic amplifier or reactor. For higher power levels, magnetic amplifiers and saturable reactors become very bulky and heavy and pieces become very expensive as well with the increase in size of these devices.

It is an object of this invention to control relatively large amounts of power by the use of magnetic amplifiers or saturable reactors of relatively small dimension and low cost.

It is also an object of this invention to utilize magnetic amplifiers, or saturable reactors, as the case may require, in conjunction with hyperconductive negative resistance diodes to control relatively large amounts of power with respect to the ratings of the magnetic amplifiers or saturable reactors used.

The objects stated are merely illustrative. Other objects and advantages will become more apparent from study of the following specification and the accompanying drawing, in which:

FIG. 1 is a diagrammatic showing of the basic principles of this invention;

FIG. 2 is a diagrammatic showing of a modification of this invention; and

FIG. 3 is a diagrammatic showing of a still further modification of this invention.

In FIG. 1, A and C are terminals energized with alternating current. These two terminals are included in a loop circuit, comprising, in the order recited, terminal A, a hyperconductive negative resistance diode HNRD, a load L, and diodes *d2* and *d1* to terminal C. The hyperconductive negative resistance diode HNRD is connected to conduct in a forward direction, the order of the recital of the loop circuit, whereas the diodes *d2*, *d1* are connected to conduct in a reverse direction. The diodes *d1* and *d2* may be copper oxide rectifiers or selenium rectifiers, or any other well-known diodes. To control the breakdown of the hyperconductive negative resistance diode, a pulse transformer T2 has its secondary winding SC connected across diode *d2* and the primary winding PR of this pulse, or triggering transformer T2, is connected in series with a current limiting resistor R and the main windings MW of the magnetic amplifier T1, the connection of this circuit being from the terminal A to the junction between the diodes *d1* and *d2*.

The magnetic amplifier T1 has a control winding CW connected across suitable points on the potentiometer POT connected across the positive and negative terminals P and N. By suitable adjustments of the tap on the potentiometer for the control winding CW, the magnitude of the current in the control winding may be selected at any value and in consequence, the point of saturation of the magnetic amplifier T1 may be selected at will.

The showing of the potentiometer POT as an adjustable input means to the control winding CW is merely to illustrate that the control signal may vary or be varied. In actual practice the input to the winding CW of the magnetic amplifier T1 does not normally come from a tap on a potentiometer. In general the signal to the control winding will be supplied from some circuit, the output of which is to be amplified. The origin of the signal may be most any kind of circuit from measurement or error signals to servo signals.

The hyperconductive negative resistance diode HNRD is selected to have a breakdown voltage that is greater than the peaks of the alternating current voltage supplied to the supply terminals A and C. It is thus apparent that the hyperconductive negative resistance diode HNRD will normally not break down when the supply terminals A and C are energized. By suitable selection of the current value in the control winding CW of the magnetic amplifier T1, the saturation of this magnetic amplifier may be controlled so that it occurs during substantially any portion of each positive half cycle. Assuming that the half cycle is selected when C is positive and that the winding relations are such that at a selected point on the half cycle T1 saturates. Further, the winding relation of SC with respect to PR is such that a voltage surge from left to right occurs across *d2*. In other words when the magnetic amplifier T1 becomes saturated, a surge of current flows in the circuit including the current limiting resistor R, primary winding PR of the pulse transformer and the main winding MW of the reactor, with the result that the secondary winding SC of the pulse transformer will produce a voltage peak in the circuit including the hyperconductive negative resistance diode HNRD which, with the addition to the voltage already on the diode HNRD, is of sufficient magnitude to produce a total voltage sufficient to cause this diode to break down. In consequence, the load L is supplied with energization during such portion of each positive half cycle as the hyperconductive negative resistance diode is broken down.

In the modification shown in FIG. 2, the load circuit in itself is substantially identical to that shown in FIG. 1. However, the left-hand terminal of the secondary winding SC of the peaking transformer T2 is connected to the positive terminal of the full-wave rectifier CR1 and the left-hand terminal of the hyper-conductive negative resistance diode HNRD is connected to the negative terminal of the full-wave rectifier CR1. The supply terminals A and C are connected directly across the alternating current terminals of the full-wave rectifier CR1. A second full-wave rectifier CR2 is provided for energizing the primary winding PR of the pulse transformer T2. The upper alternating current terminal of this second full-wave rectifier CR2 is also connected to the supply terminal C but its lower alternating current terminal is connected to the supply terminal A through the main windings RMW of the saturable reactor SR, the current limiting resistor R1 connected in parallel to capacitor C1. The saturable reactor SR is provided with control windings RCW connected to the positive and negative terminals P and N, as shown, of some signal circuit, the signal of which is to be amplified. It is, of course, apparent that this connection may also be across a potentiometer exactly as shown in FIG. 1 for the control winding CW of the magnetic amplifier T1.

Depending upon the magnitude of the current in the control windings RCW, the saturable reactor SR will saturate during any selected portion of both the positive and negative half-cycles of the alternating current supplied to the reactor main windings RMW. Each time the saturable reactor saturates, a voltage surge is supplied across the full-wave rectifier CR2 and the primary winding PR is supplied with unidirectional voltage peaks so as to cause the peaking transformer T2 to produce a voltage surge across the diode *d2* to cause the hyperconductive negative resistance diode to break down. When it breaks down, current is supplied from the supply terminal C through the full-wave rectifier CR1, secondary winding SC and diode *d2*, load L, diode HNRD, the rectifier CR1 to terminal A.

The showing in FIG. 3, except for the manner in which the main windings of the saturable reactor SR are energized, is substantially the same as that shown in FIG. 2. However, in FIG. 3, the upper terminal of the main windings RMW is connected to a junction to which the diodes *d3*, *d4*, current limit resistors R1 and R2, and capacitors C1 and C2 are connected. The connection of the diode *d4* is such as to conduct toward the supply terminal A and its lower terminal is connected in series with a parallel connected current limiting resistor R2 and the capacitor C2, which have their lower terminals connected to the junction J. The diode *d3* is connected to conduct away from the supply terminal A and its lower terminal is connected to the current limiting resistor R1 and capacitor C1 connected in parallel having their lower terminal connected to the mentioned junction J. By the circuitry shown in FIG. 3, optimum operating conditions may be obtained, particularly with the use of a good pulse transformer as T2. In this circuit, the resistors do not have to provide immediate discharging for the capacitors, but have a half-cycle or 120 of a second time for it since each is used only for alternating half-cycles. In consequence, they can be chosen much larger as long as the RC constant stays below one 120. For a particular circuit tried out, the values were 7.5K and 1 F. Furthermore, if a suitable transformer is selected to produce a big enough spike from the current change through the capacitor, the values of 30K and .25 F may be selected.

While but one embodiment and two modifications have been shown and described, it is apparent that the invention is not limited to the particular showing made, but that it is capable of other variations and modifications all within the spirit of the invention.

I claim as my invention:

1. In a system of control, in combination, a pair of terminals energized with an alternating current voltage of a selected value, a load circuit including a load unit and hyperconductive negative resistance diode means connected in series with said load unit, connected across said terminals, the breakdown voltage of said diode means being as chosen that it is greater than the peak of the alternating current voltage waves on said terminals, and means for temporarily and in any selected phase relation to the voltage peaks raise the voltage across said diode means to cause it to break down and conduct, whereby the load is electrically energized at any selected magnitude depending on the phase relation selected for the use in voltage to a value greater than the peaks of the alternating current voltage waves.

2. In a system of control, in combination, a load circuit including hyperconductive negative resistance diode means having a breakdown voltage of a selected value and a load unit connected in series therewith, a pair of terminals energized with an alternating current voltage, the peak values of which are less than the breakdown voltage of said diode, said load circuit being interconnected with said terminals, and means for temporarily and in any selected phase relation to selected voltage peaks raising the voltage across said hyperconductive negative resistance means, to thereby energize said load unit at any selected magnitude from zero to the full capacity of the supply and the hyperconductive negative resistance diode means.

3. In a system of control, in combination, a pair of terminals energized with an alternating current, the voltage peaks of which have a selected value, a load circuit connected in a loop with said terminals, said load circuit including a hyperconductive negative resistance diode having a breakdown voltage greater than the peaks of the voltage on said terminals and connected to conduct in the forward direction in the loop circuit, a load unit and a substantially conventional diode both connected in series with the hyperconductive negative resistance diode, said conventional diode being connected to conduct in the reverse direction in the loop circuit, and means for producing reverse voltage pulses across said conventional diode to trigger the breakdown of said hyperconductive negative resistance diode.

4. In a system of control, in combination, a pair of terminals energized with an alternating current, the voltage peaks of which have a selected value, a load circuit connected in a loop with said terminals, said load circuit including a hyperconductive negative resistance diode having a breakdown voltage greater than the peaks of the voltage on said terminals and connected to conduct in the forward direction in the loop circuit, a load unit and a substantially conventional diode both connected in series with the hyperconductive negative resistance diode, said conventional diode being connected to conduct in the reverse direction in the loop circuit, and means for producing sharp reverse voltage pulses, having a frequency equal to the frequency of the alternating current voltage across said terminal but at a selected phase relation to the alternating current voltage across said terminals, across said conventional diode to trigger the breakdown of said hyperconductive negative resistance diode.

5. In a system of control, in combination, a pair of terminals energized with an alternating current of a selected frequency and having voltage peaks of a selected value, a load circuit connected in a loop with said terminals, said load circuit including a hyperconductive negative resistance diode having a breakdown voltage greater than the peaks of the voltage on said terminals and connected to conduct in the forward direction in the loop, a load unit, a first substantially conventional diode, a second substantially conventional diode, all connected in series in the order recited, said conventional diodes being connected to conduct in the reverse direction in the loop, and means for producing sharp reverse voltage pulses at said selected frequency but out of phase by a selected phase angle across said conventional diode to trigger the breakdown of said hyperconductive negative resistance diode.

6. In a system of control, in combination, a pair of terminals energized with an alternating current of a selected frequency and having voltage peaks of a selected value, a load circuit connected in a loop with said terminals, said load circuit including a hyperconductive negative resistance diode having a breakdown voltage greater than the peaks of the voltage on said terminals and connected to conduct in the forward direction in the loop, a load unit, a first substantially conventional diode, a second substantially conventional diode, all connected in series in the order recited, said conventional diodes being connected to conduct in the reverse direction in the loop, a pulsing transformer having a primary winding and a secondary winding, the secondary winding being connected across said conventional diode, and electromagnetic means for producing relatively sharp current peaks at said selected frequency, but out of phase by a selected phase angle, across the primary winding of the transformer, the connection of the secondary winding across said conventional diode being such as to place a breakdown voltage across said hyperconductive negative resistance diode at each voltage output pulse.

7. In a system of control, in combination, a pair of terminals energized with an alternating current of a selected frequency and having voltage peaks of a selected value, a load circuit connected in a loop with said terminals, said load circuit including a hyperconductive negative resistance diode having a breakdown voltage greater than the peaks of the voltage on said terminals and connected to conduct in the forward direction in the loop, a load unit, a first substantially conventional diode, a second substantially conventional diode, all connected in series in the order recited, said conventional diodes being connected to conduct in the reverse direction in the loop, a pulsing transformer having a primary winding and a secondary winding, said primary winding being connected in series with a current limiting resistor and an electromagnetic triggering means connected across one of said terminals and the junction between the first and second conventional diodes, said secondary winding being connected across the first of said conventional diodes, said triggering means being adapted to produce relatively sharp current peaks at said selected frequency but out of phase by a selected phase angle across the primary winding, whereby the secondary winding causes said hyperconductive negative resistance diode to break down at each pulse.

8. In an electric system of control, in combination, a pair of terminals energized with an alternating current of a selected frequency and having voltage peaks of a selected value, a load circuit connected in a loop with the terminals, said load circuit including a hyperconductive negative resistance diode having a breakdown voltage greater than the peaks of the voltage on said terminals and connected to conduct in the forward direction in the loop, a load unit, and a substantially conventional diode all connected in series, said conventional diode being connected to conduct in the reverse direction in the loop, a peaking transformer having a primary winding and a secondary winding, the secondary winding being connected across the conventional diode, saturable reactor means having a control winding connected to be energized with any selected value of direct current to thus control the saturation of the reactor means, said saturable reactor means having main windings connected in series with the transformer primary winding and the main winding and transformer primary winding being connected to said terminals.

9. In an electric system of control, in combination, a pair of terminals energized with an alternating current of a selected frequency and having voltage peaks of a selected value, a load circuit connected in a loop with the terminals, said load circuit including a hyperconductive negative resistance diode having a breakdown voltage greater than the peaks of the voltage on said terminals and connected to conduct in the forward direction in the loop, a load unit, and a substantially conventional diode all connected in series, said conventional diode being connected to conduct in the reverse direction in the loop, a peaking transformer having a primary winding and a secondary winding, the secondary winding being connected across the conventional diode, saturable reactor means having a control winding connected to be energized with any selected value of direct current to thus control the saturation of the reactor means, a current limiting resistor, said reactor means having a main winding, connected in series with the primary winding and the current limiting resistor connected to said terminals.

10. In an electric system of control, in combination, a pair of terminals energized with an alternating current of a selected frequency and having voltage peaks of a selected value, a load circuit connected in a loop with the terminals, said load circuit including a hyperconductive negative resistance diode having a breakdown voltage greater than the peaks of the voltage on said terminals and connected to conduct in the forward direction in the loop, a load unit, and a substantially conventional diode all connected in series, said conventional diode being connected to conduct in the reverse direction in the loop, a peaking transformer having a primary winding and a secondary winding, the secondary winding being connected across the conventional diode, saturable reactor means having a control winding connected to be energized with any selected value of direct current to thus control the saturation of the reactor means, a current limiting resistor, a capacitor connected in parallel therewith, said reactor means having a winding, interconnected with the primary winding of the peaking transformer, said current limiting resistor and parallelly connected capacitor being connected to said terminals.

11. In an electric system of control, in combination, a pair of terminals energized with an alternating current of a selected frequency and having voltage peaks of a selected value, a load circuit connected in a loop with the terminals, said load circuit including a hyperconductive negative resistance diode having a breakdown voltage greater than the peaks of the voltage on said terminals and connected to conduct in the forward direction in the loop, a load unit, and a substantially conventional diode all connected in series, said conventional diode being connected to conduct in the reverse direction in the loop, a peaking transformer having a primary winding and a secondary winding, the secondary winding being connected across the conventional diode, saturable reactor means having a control winding connected to be energized with any selected value of direct current to thus control the saturation of the reactor means, an output circuit for the reactor means including a first diode connected to one of said terminals and disposed to conduct toward the terminal, a first resistor and first capacitor connected in parallel between the first diode and a junction, a second diode also connected to the terminal but is connected as to conduct away from the terminal, a second resistor and second capacitor connected in parallel between the second diode and said conjunction, a main winding for the reactor means having one terminal connected to said junction and its other terminal through the primary winding interconnected with the other supply terminal.

References Cited in the file of this patent

UNITED STATES PATENTS 1,988,294 Blaich ---------------- Jan. 15, 1935